United States Patent
Huang (10) Patent No.: US 6,641,488 B2
(45) Date of Patent: *Nov. 4, 2003

(54) ALL-WEATHER SHOCK ABSORBING GRIP FOR GOLF CLUBS AND THE LIKE

(76) Inventor: Ben Huang, 19742 Woodlands La., Huntington Beach, CA (US) 92648

( * ) Notice: Subject to any disclaimer, the term of this patent is extended or adjusted under 35 U.S.C. 154(b) by 0 days.

This patent is subject to a terminal disclaimer.

(21) Appl. No.: 10/077,097

(22) Filed: Feb. 15, 2002

(65) Prior Publication Data

US 2003/0157991 A1 Aug. 21, 2003

(51) Int. Cl.[7] ............................................... A63B 53/14
(52) U.S. Cl. ..................................... 473/302; 427/393.4
(58) Field of Search ................................. 473/300, 301, 473/302, 303; 427/393.4, 356

(56) References Cited

U.S. PATENT DOCUMENTS

| | | |
|---|---|---|
| 621,993 A | 3/1899 | Crosier |
| 1,017,565 A | 2/1912 | Lard |
| 1,665,791 A | 4/1928 | Novak |
| 2,941,806 A | 6/1960 | Stevens |
| 3,070,370 A | 12/1962 | Steiner |
| 3,252,706 A | 5/1966 | Rosasco, Sr. |
| 3,311,375 A | 3/1967 | Onions |
| 3,524,646 A | 8/1970 | Wheeler |
| 4,053,676 A | * 10/1977 | Kaminstein ............... 428/313.5 |
| 4,250,135 A | * 2/1981 | Orsini ......................... 264/227 |
| 5,055,340 A | * 10/1991 | Matsumura et al. ........ 428/172 |
| 5,145,171 A | 9/1992 | Head et al. |
| 5,478,074 A | 12/1995 | Storper |
| 5,513,845 A | 5/1996 | Sonagere |
| 5,620,180 A | 4/1997 | Hong |
| 5,626,527 A | 5/1997 | Eberlein |
| 5,645,501 A | * 7/1997 | Huang ........................ 473/549 |
| 5,653,643 A | * 8/1997 | Falone et al. ............... 473/300 |
| 5,730,662 A | 3/1998 | Rens |
| 5,797,813 A | * 8/1998 | Huang ........................ 473/549 |
| 5,857,929 A | * 1/1999 | Huang ........................ 473/549 |

FOREIGN PATENT DOCUMENTS

JP            2-69228    *  3/1990

* cited by examiner

Primary Examiner—Stephen Blau
(74) Attorney, Agent, or Firm—Fulwider Patton Lee & Utecht, L.L.P.

(57) ABSTRACT

A slip-on golf club grip that includes an elongated strip having a backing layer to the upper surface of which is bonded a layer of polyurethane, with the upper surface of the polyurethane being heat-embossed with a friction enhancing pattern engaged by a player's hands, the friction enhancing pattern defining water collection interstices. The strip is spirally wrapped around a resilient underlisting to provide a unique slip-on grip, with water collected in the interstices being readily wiped off to dry the outside of the strip. The upper surface of the polyurethane layer is densfied and rendered substantially water tight by the heat embossing.

25 Claims, 7 Drawing Sheets

ALL-WEATHER SHOCK ABSORBING GRIP FOR GOLF CLUBS AND THE LIKE

BACKGROUND OF THE INVENTION

The present invention relates to an improved grip for golf clubs and other devices employing handles that are subject to shock when such devices are impacted, as for example, golf clubs, tennis racquets, racquetball racquets, baseball bats, and hammers. The present invention also provides a method for making such grips.

There have previously been developed resilient grips which successfully reduce shock to the muscle and arm joints of the users of golf clubs, tennis racquets, racquet ball racquets, baseball bats and other impact imparting devices. See, for example, U.S. Pat. No. 5,797,813 granted to applicant Aug. 25, 1998. Such earlier grips utilize a polyurethane layer bonded to a felt layer to define a strip which is spirally wrapped around the handle of a golf club, racquet or the like to conform to the external configuration of such handle, or in the case of a golf club, a resilient underlisting sleeve which is slipped onto the handle of a golf club.

In such grips the polyurethane material provides tackiness to resist slippage by a wet or sweaty hand, while both the polyurethane as well as the felt contribute to the overall cushioning effect of the grip. The felt material additionally serves as a substrate for the manufacture of the polyurethane layer when a 'wet coagulation' method is employed, wherein the polyurethane is applied directly to the felt as the felt is drawn through the various manufacturing stages in a continuous process. Coagulation of the polyurethane takes place after its deposition on the felt which causes it to become intimately joined with the felt fibers. Such coagulation also forms closed pores in the polyurethane layer which assists in providing a cushioning effect of the grip.

While prior art polyurethane/felt grips have been developed that provide the desired shock absorption properties, such grips are prone to absorbing water. Accordingly, the grip will tend to absorb the perspiration from the user's hand and may become saturated during play thereby causing slippage of the golf club or tennis racquet in the user's hands. The same problem occurs under wet conditions such as when playing golf in the rain. The golfer then either stops playing, or alternatively continues his game with reduced pleasure because of slippage of the grip in his hands.

SUMMARY OF THE INVENTION

Applicant has developed an all-weather grip which may be used under both wet and dry playing conditions with equally good results. Accordingly, in the event of rain the golfer can continue to play without slippage of the grip within the golfer's hands.

This remarkable result is obtained by providing a golf club grip that includes an elongated strip, said strip including a backing layer to the upper surface of which is bonded a layer of polyurethane, with the upper surface of the polyurethane layer being heat-embossed with a friction enhancing pattern engaged by a golfer's hands. The upper surface of the polyurethane layer is rendered water tight as a result of the heat embossing. The friction enhancing pattern includes a large number of repetitive shapes, such as squares or diamonds, with the interstices of the shapes serving to collect water that accumulates on the grip as from rain. Water collected in the interstices can be readily wiped off with a towel permitting continued play despite rainy conditions. Under dry conditions the friction enhancing pattern inhibits slippage between the grip and the golfer's hands. Heat embossing of the polyurethane layer also serves to increase the density of such layer with a resulting increase in the strength of the layer and hence of the strip.

The present invention also provides a method for making the aforedescribed grip.

DETAILED DESCRIPTION OF PREFERRED EMBODIMENT

Figures 22, 23:
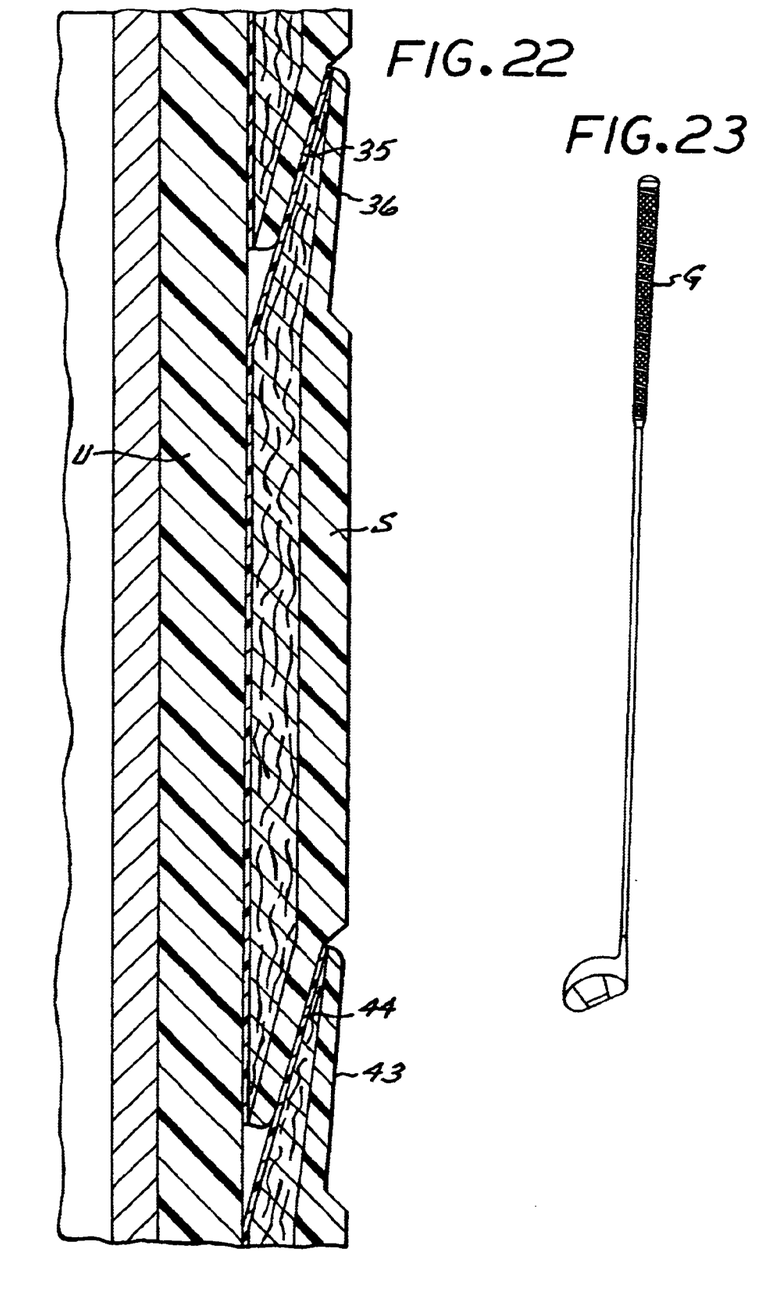
FIG. 22 is a vertical sectional view taken in enlarged scale along line 22—22 of FIG. 19.
FIG. 23 is a perspective view of a golf club provided with a grip embodying the present invention.

Referring to the drawings, a grip G formed in accordance with the present invention utilizes an elongated resilient strip S which is spirally wrapped around a resilient underlisting sleeve (FIGS. 19–22) which is slipped onto the handle of a golf club (FIG. 23), or directly onto the handle of a golf club. Such strip may also be applied to the handle of other impact imparting devices (not shown). Strip S includes a polyurethane layer P and a backing layer B, preferably of felt. The underside of the backing layer B is originally covered with a conventional double adhesive-sided peel-off tape T. All or substantially all of the upper surface of polyurethane layer P is heat embossed with a friction enhancing pattern F engaged by a golfer's hands.

More particularly, referring to FIGS. 1–14 there is shown a preferred method of making the strip S from a roll 30 of polyurethane-felt material. The felt layer B is formed of a suitable open-pored material such as nylon, cotton, wool or the like, and has its upper or outer surface bonded to the lower surface of the polyurethane layer P. The polyurethane layer P is formed with pores (not shown) which extend vertically, i.e., generally normal to the longitudinal axis of the strip S and racquet handle or golf club handle when the grip has been affixed to such handle. The polyurethane layer P may be formed in a conventional manner by coating one side of a felt strip with a solution of polyurethane (e.g., polyester or polyether) dissolved in a dimethyl formamide (DMF), immersing the coated strip in water baths to displace the DMF and cause the urethanes to coagulate, and finally driving off the water by the application of pressure and heat. In this manner, the pores will extend perpendicularly relative to the longitudinal axis of the strip, while the underside of the polyurethane layer P is bonded to the upper surface of the felt strip. Other materials may be substituted for felt as a backing layer B to provide strength for polyurethane layer P, e.g., a synthetic plastic such as an ethylene-vinyl acetate copolymer, commonly known as EVA.

Figures 1, 2:
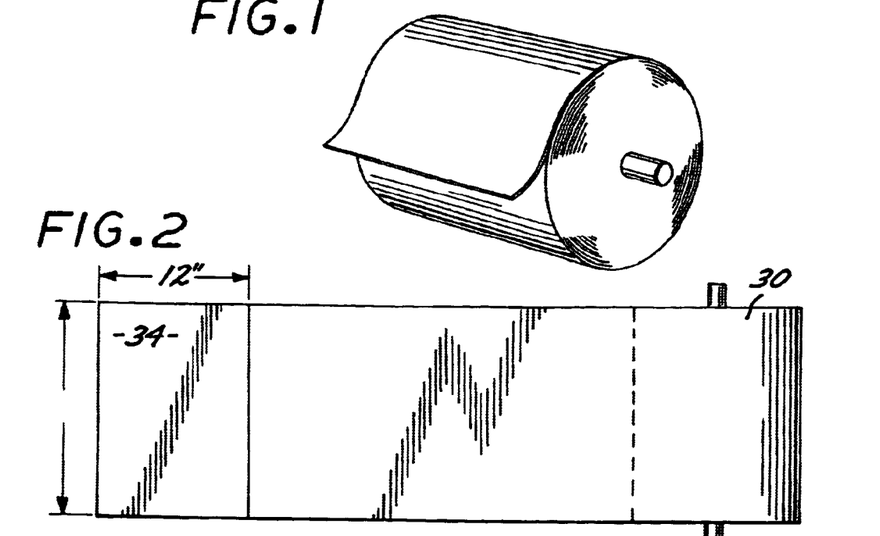
FIG. 1 is perspective view of a roll of polyurethane-felt material utilized in making a grip embodying the present invention.
FIG. 2 is a top plan view showing the roll of FIG. 1 being dimensioned into a panel.
Figure 3:
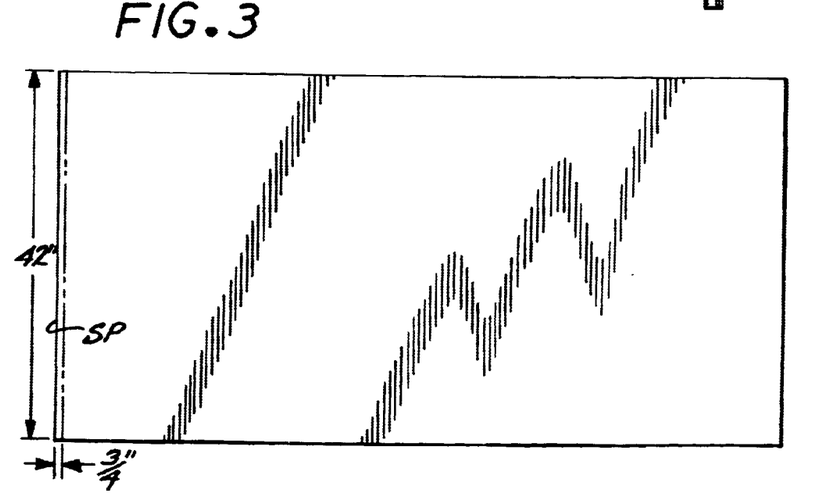
FIG. 3 is a top plan view showing a portion of the panel of FIG. 3 dimensioned for cutting therefrom a plurality of strip blanks in accordance with the present invention.
Figure 4:
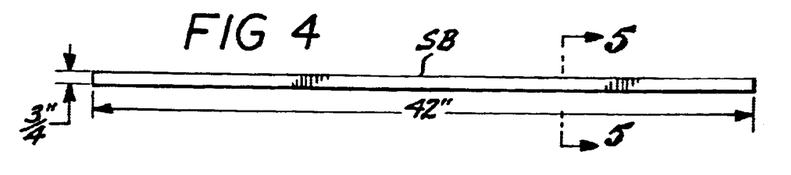
FIG. 4 is a top plan view of a strip blank cut from the panel of FIG. 3.
Figure 5:
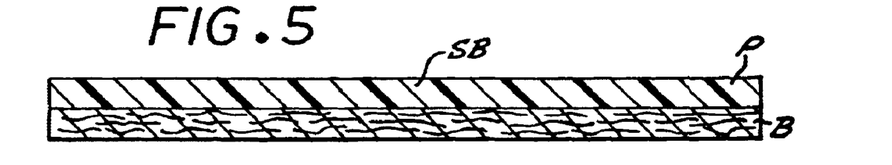
FIG. 5 is a vertical sectional view taken in enlarged scale along lines 5—5 of FIG. 4.
Figure 6:
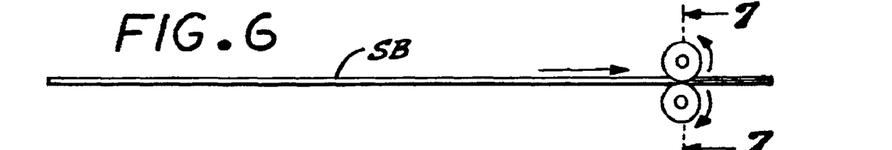
FIG. 6 is a reduced vertical sectional view showing heat recessed reinforcement side edges being formed in the polyurethane layer of the strip blank of FIG. 5.
Figure 7:
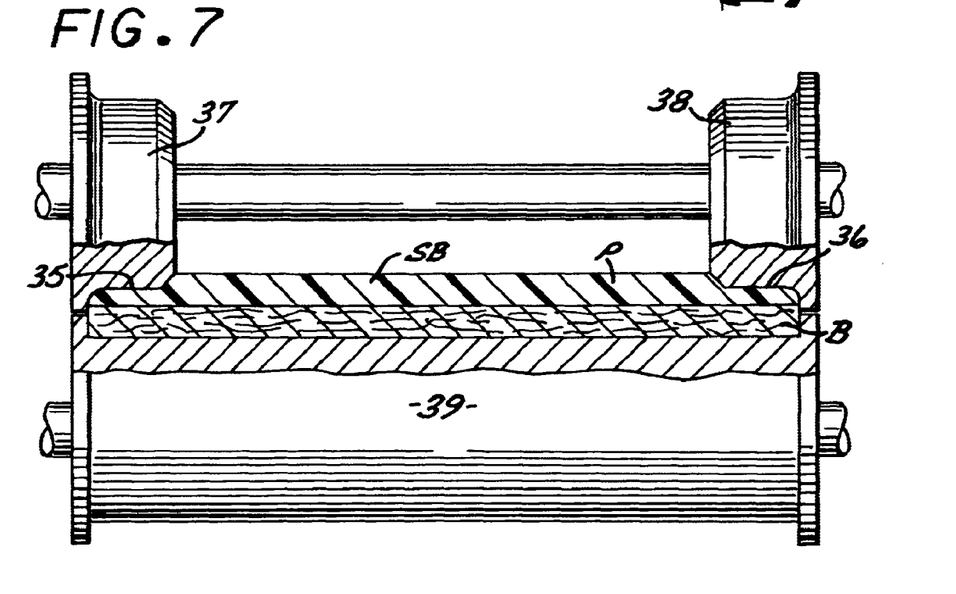
FIG. 7 is a vertical sectional view taken in enlarged scale along line 7—7 of FIG. 6.
Figure 8:
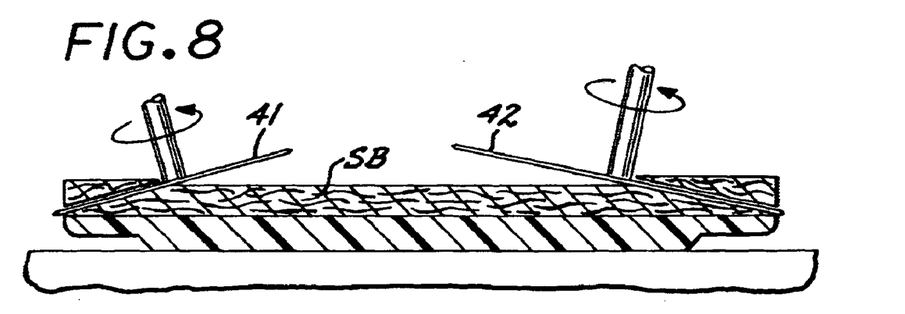
FIG. 8 is a vertical sectional view showing the side edges of the strip blank of FIG. 7 being skived to define slanted side edges in such blank.
Figure 9:
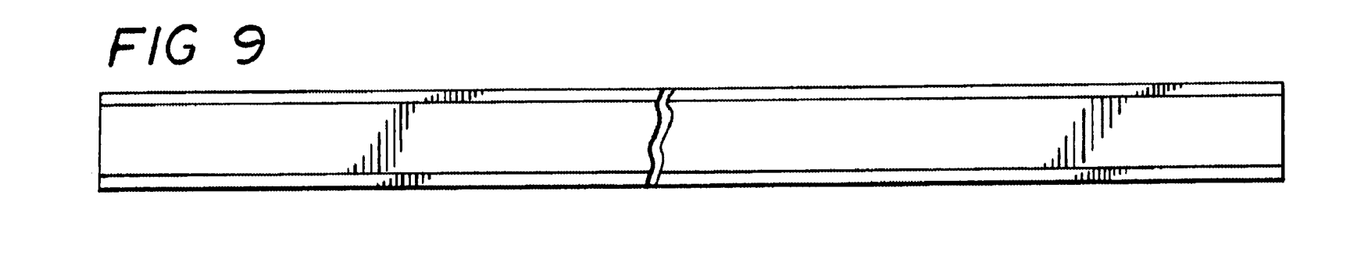
FIG. 9 is a top plan view of a strip blank before its upper surface is heat embossed with a friction enhancing pattern.

Referring now to FIGS. 1–5, there is shown an arrangement for cutting a blank SB from roll 30 from which is formed a strip S. In FIG. 2, a panel 34 of the polyurethane-felt material is cut from roll 30. By way of example the width of such panel can be 42 inches, and the length 12 inches. A plurality of strip blanks SB can be cut from the panel 34 as shown in FIGS. 3 and 4, with each such strip blank 32 having a width of ¾ inch by way of example. A resulting strip blank SB is shown in FIGS. 4 and 5. In FIGS. 6 and 7 the sides of the polyurethane layer P of the blank are shown being formed with recessed reinforcement edges 35 and 36 as by means of heated rollers 37, 38, and 39 such as shown in my U.S. Pat. No. 6,203,308. In FIG. 8, the sides of the felt layer B are shown being skived as by rotating knives 41 and 42 in a conventional manner so as to define the slanted side edges 43 and 44 of a completed strip S.

Figure 10:
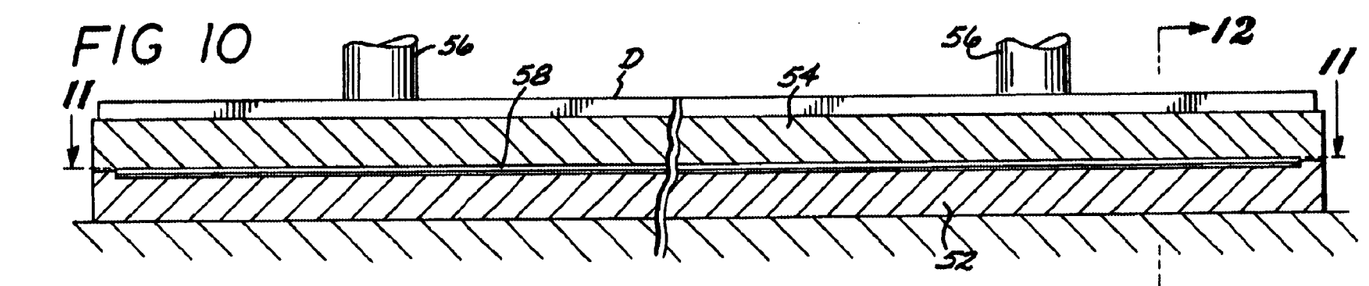
FIG. 10 is a vertical sectional view of a die used to heat emboss the upper surface of the strip blank with a friction enhancing pattern.
Figure 11:
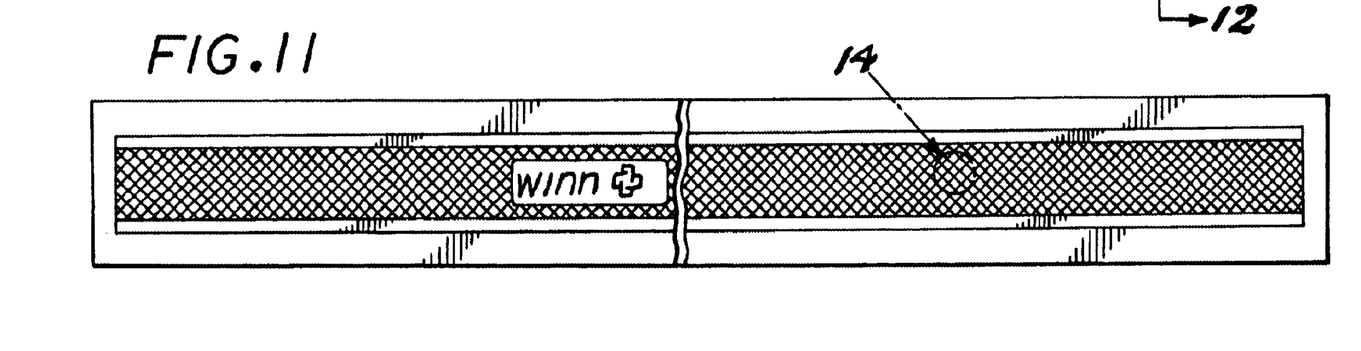
FIG. 11 is a horizontal sectional view taken along line 11—11 of FIG. 10
Figure 12:
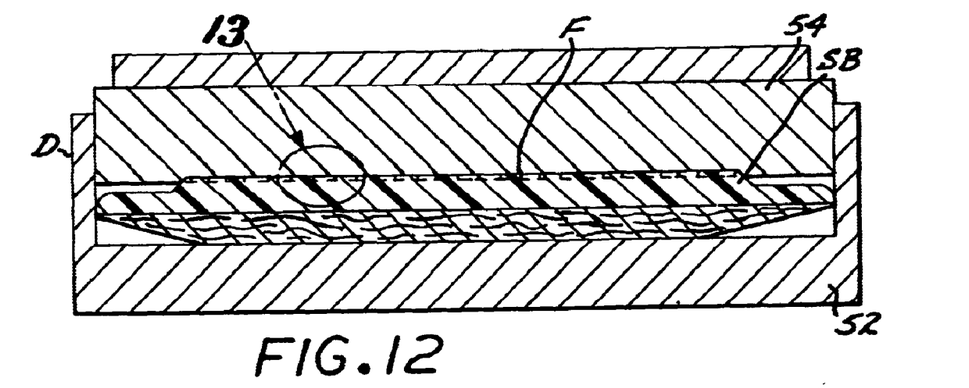
FIG. 12 is a vertical sectional view taken in enlarged scale along line 12—12 of FIG. 10.
Figure 13:
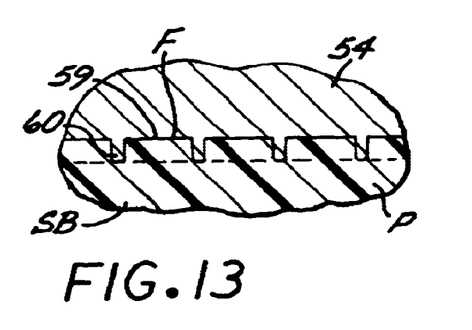
FIG. 13 is an enlarged side view of the encircled area 13 in FIG. 12.
Figure 14:
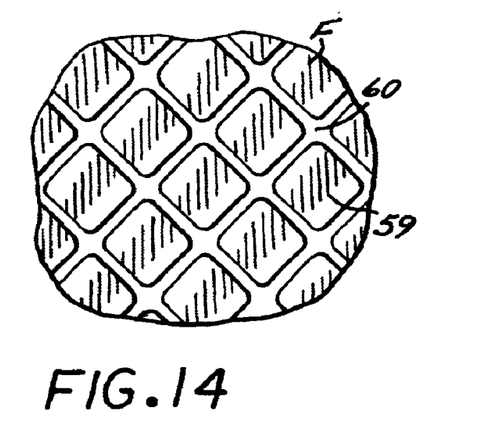
FIG. 14 is an enlarged top view of the encircled area 14 in FIG. 11.

Referring now to FIGS. 10–12, there is shown a heated steel die D utilized to form friction enhancing pattern F on the upper surface of the strip blank SB. Die D includes a bottom half 52 and a complementary upper half 54. Upper die half 52 is vertically movable relative to the lower die half by power-operated plungers 56 in a conventional manner. The underside of upper die half 54 is engraved to define pattern F. A cavity 58 is formed between the upper and bottom die halves to removably receive a strip blank SB that is to be formed with pattern F. With a strip blank SB disposed in the cavity, upper die-half 52 is urged downwardly into the polyurethane layer P so as to partially permanently depress such layer and concurrently heat emboss pattern F upon the upper surface of such layer. Such heat embossing increases the density of the polyurethane layer with a resulting increase in the strength of this layer. The magnitude of density increase is generally proportional to the thickness of the strip S. By way of example, where the strip thickness is 1.8 mm, the felt layer can be 1.4 mm as compared to a 0.4 mm polyurethane layer, and the polyurethane layer can be decreased in thickness 0.07–0.1 mm. Heat embossing the polyurethane layer P also renders such layer substantially water tight.

Friction enhancing pattern F includes a large number of small repetitive shapes 59, such as squares or diamonds, with the interstices 60 of these shapes cooperating to collect water that may accumulate on the outer surface of the grip. When a grip G utilizing the strip S is wetted, as by rain, water collected in these interstices 60 can be readily removed by wiping the grip with a towel (not shown). The grip is then immediately ready for continued play despite the rain. During dry playing conditions, friction enhancing pattern F resists slippage between grip G and a golfer's hands.

Figure 15:
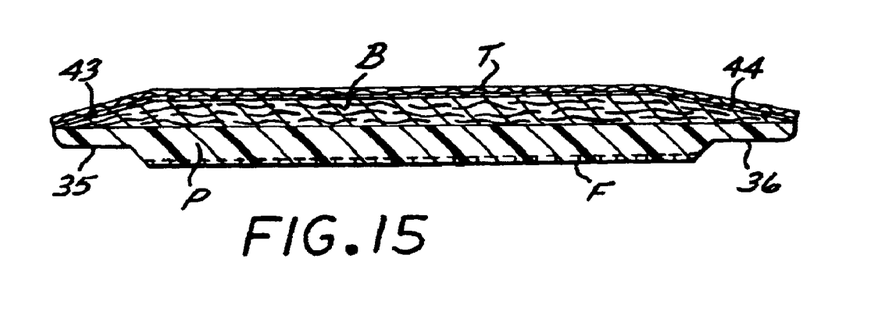
FIG. 15 is a vertical sectional view of a finished strip embodying the present invention.
Figure 16:
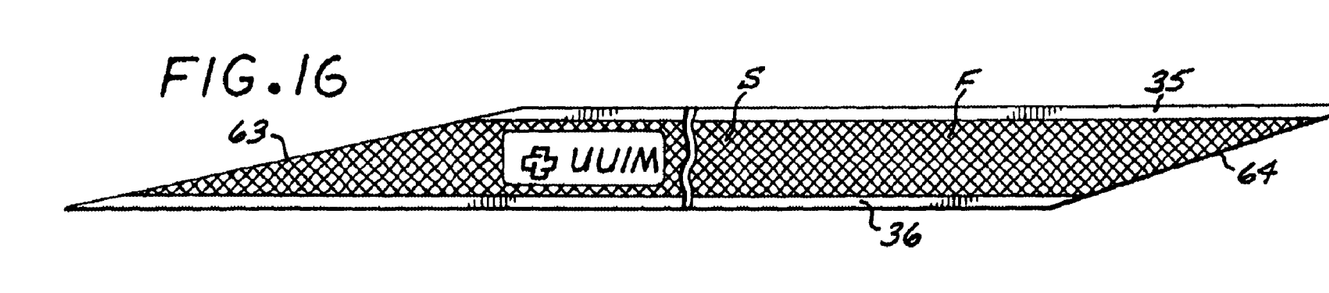
FIG. 16 is a top plan view of the heat embossed upper surface of the strip of FIG. 15.

After the strip S has been heat embossed with friction enhancing pattern F, peel-off adhesive tape T is adhered to the underside of felt layer B, as shown in FIG. 15. Tapered starting and trailing ends 63 and 64 are then cut from the strip blank SB to define a completed strip S, as shown in FIG. 16. The completed strip S can now be applied to am underlisting sleeve U of the type shown in my patent application Ser. No. 09/497,750, now U.S. Pat. No. 6,386,985 or directly to the bare shaft of a golf club.

Figure 17:
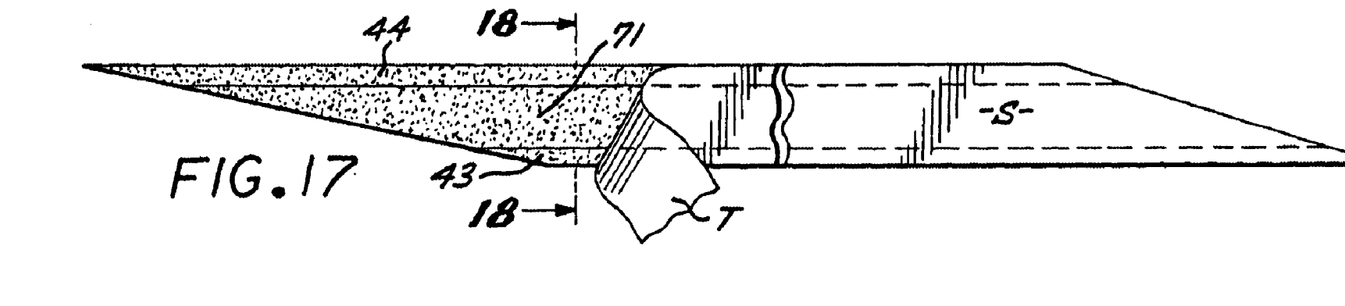
FIG. 17 is a top plan view showing a peel-off adhesive tape being removed from the underside of the strip of FIG. 16.
Figure 18:
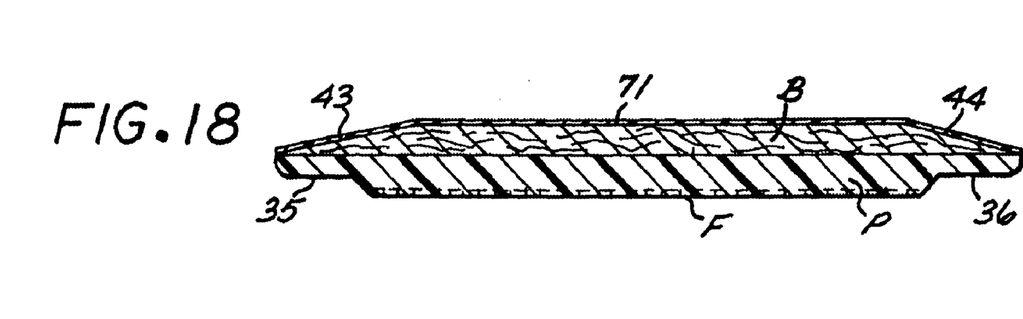
FIG. 18 is a vertical sectional view taken in enlarged scale along line 18—18 of FIG. 17.
Figure 19:
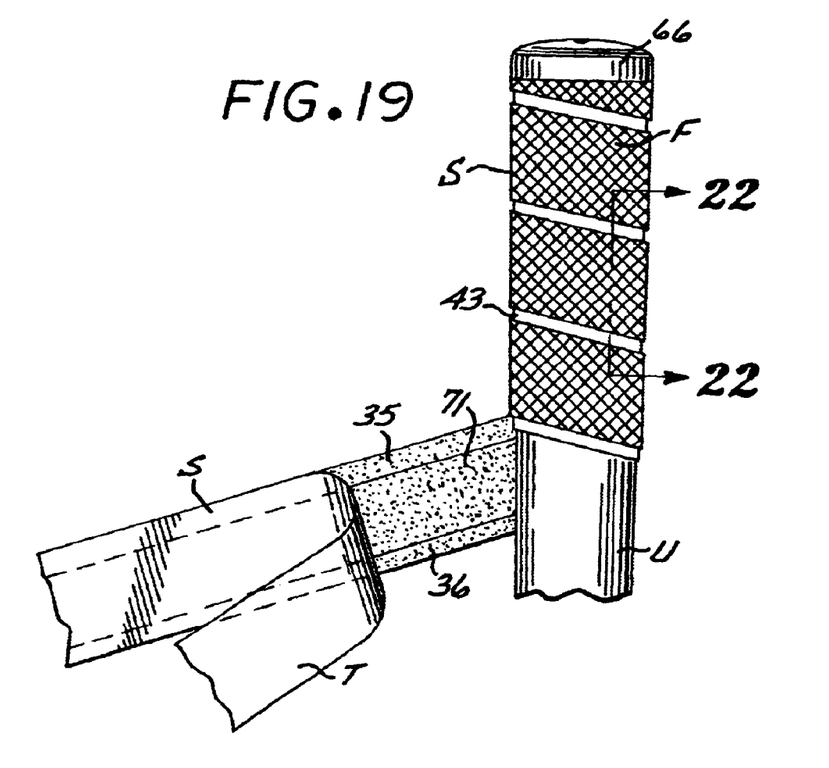
FIGS. 19, 20 and 21 are broken side view showing the aforedescribed strip being applied to an underlisting sleeve in accordance with the present invention.
Figure 20:
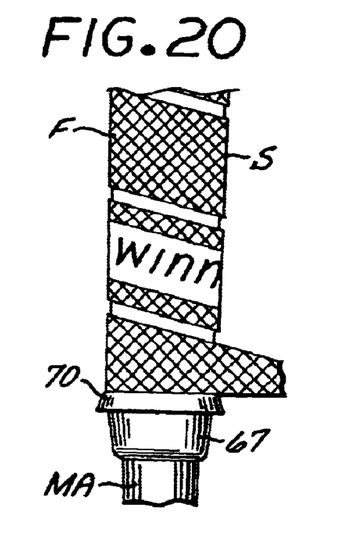
Figure 21:
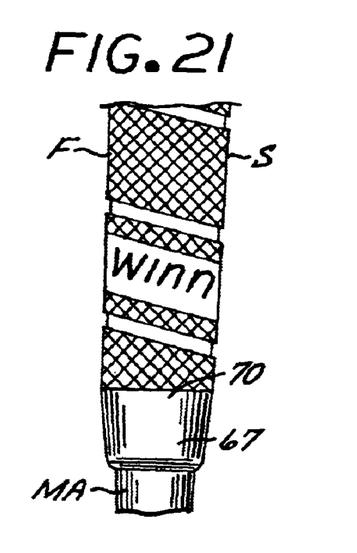

Referring now to FIGS. 19–22, there is shown a resilient rubber-like underlisting U which can be utilized in forming a slip-on grip G of the present invention. Underlisting sleeve U is fabricated of a synthetic plastic foam or rubber utilizing an integral cap 66. Below the cap 66 there is formed a groove (not shown) to receive the starting end 63 of a completed strip S described hereinabove. The lower end of the sleeve U is formed with an integral nipple 67. The upper portion of the nipple is provided with a resilient lip 70. To apply strip S to the underlisting sleeve U, the paper of protective tape T is peeled-off to expose adhesive 71, as indicated in FIGS. 17 and 19. The strip S is then spirally wound around the underlisting sleeve U, the tip of the strip starting edge being first inserted below cap 66 of the sleeve whereafter the strip is wrapped about one and a half times around the upper or butt end of the sleeve to provide a smooth configuration of the strip on the sleeve. With continued reference to FIG. 19, as the strip S is wrapped around the underlisting sleeve U, the underside of the recessed side edges 35 and 36 of the polyurethane layer P overlap one another with such edges being secured together in a water-tight manner by adhesive 71. When the lower edge of the strip has been spirally wound to a position wherein its lower edge is disposed in horizontal alignment with the upper portion of the nipple, lip 70 is folded downwardly, and the lower portion of the strip is wrapped about the upper portion of the nipple. The lip then snaps back to its original position, and will securely retain the lower end of the strip S on the nipple to prevent unraveling of the strip and also provide a nicely finished appearance of the grip. It should be understood that the underlisting sleeve U may be disposed upon a conventional collapsible mandrel MA as the strip is wrapped therearound. After the strip and sleeve combination is removed from the mandrel MA such combination will define the aforedescribed strip G which is slipped over the handle of a golf club as shown in FIG. 23.

From the foregoing description it will be seen that the golf club grip of the present invention is truly an all weather grip which can resist twisting of a golf club handle relative to a golfer's hands under both wet and dry conditions. Under rainy conditions the grip can be maintained dry by merely wiping it off with a towel. It is difficult to maintain the conventional polyurethane grip dry by toweling because water soaks into the polyurethane layer. Under dry conditions the friction generated between a golfer's hands and the repetitive shapes of the friction enhancing pattern resists twisting of a golf club handle without requiring the golfer to tightly grasp the grip. The densification of the polyurethane layer during the heat embossing thereof strengthens the grip resulting in a light weight construction permitting a higher club-head speed with no loss of accuracy. Such densification also affords a high resistance against unraveling of the strip relative to the underlisting sleeve. Finally, the friction enhancing pattern affords a distinctive appearance for the grip.

While a particular form of the invention has been illustrated and described, it will also be apparent to those skilled in the art that various modifications can be made without departing from the spirit and scope of the invention. Accordingly, it is not intended that the invention be limited except by the appended claims.

I claim:

1. A golf club grip that includes an elongated strip, said strip having a backing layer to the upper surface of which is bonded a layer of polyurethane, with the upper surface of the polyurethane being heat-embossed with a friction enhancing pattern engaged by a players hands, the friction enhancing pattern defining water collection interstices, with water collected in the interstices being readily wiped off to dry the outside of the strip; and the upper surface of the polyurethane layer being densified and rendered substantially water tight by the heat embossing.

2. A golf club grip as set forth in claim 1, wherein the backing layer includes an EVA.

3. A golf club grip as set forth in claim 1, wherein the friction enhancing pattern includes a large number of repetitive shapes which define the water collection interstices.

4. A golf club grip as set forth in claim 1, wherein the side edges of the polyurethane layer are heat-compressed so as to define recessed reinforcement side edges and slanted skived side edges are formed along the length of the backing layer of the strip.

5. A golf club grip as set forth in claim 4 wherein the backing layer includes an EVA.

6. A slip-on golf club grip that includes an elongated strip and a resilient underlisting sleeve about which the strip is spirally wrapped and adhered, said strip including:

a backing lawyer to the upper surface of which is bonded a layer of polyurethane, with the upper surface of the polyurethane being heat-embossed with a friction enhancing pattern engaged by a players hands, the friction enhancing pattern defining water collection interstices, with water collected in the interstices being readily wiped off to dry the outside of the grip; and the upper surface of the polyurethane layer being densified and rendered substantially water tight by the heat embossing.

7. A slip-on golf club grip as set forth in claim 6, wherein the backing layer includes EVA.

8. A slip-on golf club grip as set forth in claim 6, wherein the friction enhancing pattern includes a large number of repetitive shapes which cooperate to define the water collection interstices.

9. A slip-on golf club grip as set forth in claim 6, wherein the side edges of the polyurethane layer are heat-compressed so as to define recessed reinforcement side edges and slanted skived side edges are formed along the length of the backing layer of the strip; and the recessed side edges adhesively overlapping one another on the underlisting sleeve in a water-tight manner.

10. A method of making an elongated strip for use in a golf club grip, said method including the steps of:

providing a strip blank having a polyurethane layer over a backing layer;

forming heat compressed radially inwardly extending reinforcement side edges in the polyurethane layer of the strip blank;

forming slanted side edges in the backing layer of the strip blank;

heat embossing a friction enhancing pattern upon the upper surface of the polyurethane layer thereby densifying the polyurethane layer and also rendering the upper surface thereof substantially water-tight; and with the friction enhancing pattern defining water collecting interstices being readily wiped off to dry the outside of the strip.

11. A method of making an all weather slip-on golf club grip, said method including the steps of:

providing a resilient underlisting sleeve;

providing a strip blank having a polyurethane layer over a backing layer;

forming heat compressed radially inwardly extending reinforcement side edges in the polyurethane layer of the strip blank;

forming slanted side edges in the backing layer of the strip blank;

applying an adhesive over the outer surface of the backing layer opposite the polyurethane layer;

heat embossing a friction enhancing pattern upon substantially all of the upper surface of the polyurethane layer thereby densifying the polyurethane layer and also rendering the upper surface thereof substantially water-tight, with the friction enhancing pattern defining water collecting interstices that can be readily wiped off to dry the outside of the strip; and spirally winding the strip about the resilient underlisting sleeve with the side edges adhesively overlapping one another on the sleeve in a water-tight manner.

12. A golf club grip as set forth in claim 11, wherein the backing layer is EVA.

13. A golf club grip as set forth in claim 11, wherein the friction enhancing pattern includes a large number of repetitive shapes which cooperate to define the water collection interstices.

14. A golf club grip that includes an elongated strip, said strip having a backing layer to the upper surface of which is bonded a layer of polyurethane, with the upper surface of the polyurethane being heat-embossed with a friction enhancing pattern engaged by a players hands, the friction enhancing pattern defining water collection interstices, with water collected in the interstces being readily wiped off to dry the outside of the strip; and with heat embossing of the upper surface of the polyurethane layer densifying and thereby increasing the strength of the pojyurethane layer aid additionally rendering the upper surface of the polyurethane layer substantially watertight.

15. A golf club grip as set forth in claim 14, wherein the backing layer is of felt.

16. A golf club grip as set forth in claim 14, wherein the friction enhancing pattern includes a large number of repetitive shapes which define the water collection interstices.

17. A golf club grip as set forth in claim 14, wherein the side edges of the polyurethane layer are heat-compressed so as to define recessed reinforcement side edges and slanted skived side edges are formed along the length of the backing layer of the strip.

18. A golf club grip as set forth in claim 14, wherein the backing layer is of felt.

19. A slip-on golf club grip that includes an elongated strip and a resilient underlisting sleeve about which the strip is spirally wrapped and adhered, said elongated strip including:

a backing layer to the upper surface of which is bonded a layer of polyurethane, with the upper surface of the polyurethane being heat-embossed with a friction enhancing pattern engaged by a player's hands, the friction enhancing pattern defining water collection interstices, with water collected in the interstices being readily wiped off to dry the outside of the grip; and     with heat embossing of the upper surface of the polyurethane layer densifying and thereby increasing the strength of the polyurethane layer and additionally rendering the upper surface of the polyurethane layer substantially watertight.

20. A slip on golf club grip as set forth in claim 19, wherein the backing layer is of felt.

21. A slip on golf club grip as set forth in claim 19, wherein the friction enhancing pattern includes a large number of repetitive shapes which cooperate to define the water collection interstices.

22. A slip on golf club grip as set forth in claim 19, wherein the side edges of the polyurethane layer are heat-compressed so as to define recessed reinforcement side edges and slanted skived side edges are formed along the length of the backing layer of the strip; and the recessed side edges adhesively overlapping one another on the underlisting sleeve in a watertight manner.

23. A golf club grip, comprising:

a resilient underlisting sleeve formed at its upper end with a cap and at its lower end with a nipple;

an elongated strip that includes a backing layer to the upper edge of which is bonded a layer of polyurethane;

with the upper surface of the polyurethane being heat-embossed with a friction enhancing pattern engaged by a player's hands, the friction enhancing pattern defining water collection interstices, with water collected in the Interstices being readily wiped off to dry the outside of the grip;

the side edges of the polyurethane layer being heat-compressed so as to define recessed reinforcement side edges and slanted side edges are formed along the length of the backing layer;

the strip being spirally wrapped about and adhered to the underlisting sleeve with the underside of the adjoining recessed reinforcement side edges overlapping and adhered to one another in a watertight manner; and     with heat embossing of the upper surface of the polyurethane layer densifying and thereby increasing the strength of the polyurethane layer and additionally rendering the upper surface of the polyurethane substantially watertight.

24. A golf club grip as set forth in claim 23, wherein the friction enhancing pattern includes a large number of repetitive shapes which define the water collection interstices.

25. A golf club grip as set forth in claim 24, wherein the backing layer is of felt.

\* \* \* \* \*